(12) United States Patent
Frank et al.

(10) Patent No.: US 8,996,460 B1
(45) Date of Patent: Mar. 31, 2015

(54) ACCESSING AN IMAGE IN A CONTINUOUS DATA PROTECTION USING DEDUPLICATION-BASED STORAGE

(71) Applicant: EMC Corporation, Hopkinton, MA (US)

(72) Inventors: Shahar Frank, Ramat Hasharon (IL); Assaf Natanzon, Tel Aviv (IL); Jehuda Shemer, Kfar Saba (IL)

(73) Assignee: EMC Corporation, Hopkinton, MA (US)

( * ) Notice: Subject to any disclaimer, the term of this patent is extended or adjusted under 35 U.S.C. 154(b) by 187 days.

(21) Appl. No.: 13/827,862

(22) Filed: Mar. 14, 2013

(51) Int. Cl.
*G06F 17/30* (2006.01)

(52) U.S. Cl.
CPC ................ *G06F 17/30088* (2013.01)
USPC ........... 707/624; 707/656; 707/681; 707/692; 707/813; 711/162

(58) Field of Classification Search
CPC ............ G06F 11/1453; G06F 11/1471; G06F 17/30088; G06F 17/30368; G06F 3/0641; G06F 2201/84; G06F 11/1469; G06F 11/1448
USPC ......... 707/624, 679, 680, 681, 610, 656, 657, 707/692, 813; 711/162
See application file for complete search history.

(56) References Cited

U.S. PATENT DOCUMENTS

| | | | |
|---|---|---|---|
| 5,170,480 A | 12/1992 | Mohan et al. | |
| 5,388,254 A | 2/1995 | Betz et al. | |
| 5,499,367 A | 3/1996 | Bamford et al. | |
| 5,864,837 A | 1/1999 | Maimone | |
| 5,879,459 A | 3/1999 | Gadgil et al. | |
| 5,990,899 A | 11/1999 | Whitten | |
| 6,042,652 A | 3/2000 | Hyun et al. | |
| 6,065,018 A | 5/2000 | Beier et al. | |
| 6,143,659 A | 11/2000 | Leem | |
| 6,148,340 A | 11/2000 | Bittinger et al. | |
| 6,174,377 B1 | 1/2001 | Doering et al. | |
| 6,174,809 B1 | 1/2001 | Kang et al. | |
| 6,203,613 B1 | 3/2001 | Gates et al. | |
| 6,260,125 B1 | 7/2001 | McDowell | |
| 6,270,572 B1 | 8/2001 | Kim et al. | |
| 6,272,534 B1 | 8/2001 | Guha | |
| 6,287,965 B1 | 9/2001 | Kang et al. | |
| 6,467,023 B1 | 10/2002 | DeKoning et al. | |
| 6,574,657 B1 | 6/2003 | Dickinson | |
| 6,621,493 B1 | 9/2003 | Whitten | |

(Continued)

FOREIGN PATENT DOCUMENTS

| EP | 1154356 | 11/2001 |
|---|---|---|
| WO | WO 00 45581 A3 | 8/2000 |

OTHER PUBLICATIONS

Microsoft Computer Dictionary, 2002 Press Fifth Edition, p. 58.

(Continued)

*Primary Examiner* — Dennis Truong
(74) *Attorney, Agent, or Firm* — Daly, Crowley, Mofford & Durkee, LLP

(57) ABSTRACT

In one aspect, a method to generate a point-in-time (PIT) snapshot of deduplication-based volume includes generating a virtual access data structure, generating a preliminary snapshot of the volume and modifying the preliminary snapshot to point to a block according to the virtual access data structure to generate the PIT snapshot of the deduplication-based volume.

20 Claims, 5 Drawing Sheets

(56) References Cited

U.S. PATENT DOCUMENTS

| | | | |
|---|---|---|---|
| 6,804,676 B1 | 10/2004 | Bains, II | |
| 6,947,981 B2 | 9/2005 | Lubbers et al. | |
| 7,043,610 B2 | 5/2006 | Horn et al. | |
| 7,076,620 B2 | 7/2006 | Takeda et al. | |
| 7,111,197 B2 | 9/2006 | Kingsbury et al. | |
| 7,117,327 B2 | 10/2006 | Hirakawa et al. | |
| 7,120,768 B2 | 10/2006 | Mizuno et al. | |
| 7,130,975 B2 | 10/2006 | Suishu et al. | |
| 7,139,927 B2 | 11/2006 | Park et al. | |
| 7,146,439 B1 | 12/2006 | Ofer et al. | |
| 7,159,088 B2 | 1/2007 | Hirakawa et al. | |
| 7,167,963 B2 | 1/2007 | Hirakawa et al. | |
| 7,222,136 B1 | 5/2007 | Brown et al. | |
| 7,296,008 B2 | 11/2007 | Passerini et al. | |
| 7,328,373 B2 | 2/2008 | Kawamura et al. | |
| 7,360,113 B2 | 4/2008 | Anderson et al. | |
| 7,426,618 B2 | 9/2008 | Vu et al. | |
| 7,516,287 B2 | 4/2009 | Ahal et al. | |
| 7,519,625 B2 | 4/2009 | Honami et al. | |
| 7,519,628 B1 | 4/2009 | Leverett | |
| 7,546,485 B2 | 6/2009 | Cochran et al. | |
| 7,577,867 B2 | 8/2009 | Lewin et al. | |
| 7,606,940 B2 | 10/2009 | Yamagami | |
| 7,627,612 B2 | 12/2009 | Ahal et al. | |
| 7,627,687 B2 | 12/2009 | Ahal et al. | |
| 7,719,443 B1 | 5/2010 | Natanzon | |
| 7,757,057 B2 | 7/2010 | Sangapu et al. | |
| 7,769,931 B1 | 8/2010 | Angelone et al. | |
| 7,774,565 B2 | 8/2010 | Lewin et al. | |
| 7,797,358 B1 | 9/2010 | Ahal et al. | |
| 7,844,856 B1 | 11/2010 | Ahal et al. | |
| 7,849,361 B2 | 12/2010 | Ahal et al. | |
| 7,860,836 B1 | 12/2010 | Natanzon et al. | |
| 7,882,286 B1 | 2/2011 | Natanzon et al. | |
| 7,904,681 B1 | 3/2011 | Bappe et al. | |
| 7,908,515 B1 | 3/2011 | Schechner et al. | |
| 7,921,077 B2* | 4/2011 | Ting et al. | 707/610 |
| 7,945,640 B1 | 5/2011 | Van Tine | |
| 7,958,372 B1 | 6/2011 | Natanzon | |
| 7,962,567 B1 | 6/2011 | Sandstrom et al. | |
| 8,032,492 B2* | 10/2011 | Vishlitzky et al. | 707/657 |
| 8,060,713 B1* | 11/2011 | Natanzon | 711/162 |
| 8,108,634 B1 | 1/2012 | Natanzon et al. | |
| 8,140,821 B1 | 3/2012 | Raizen et al. | |
| 8,150,936 B2 | 4/2012 | Liu et al. | |
| 8,166,314 B1 | 4/2012 | Raizen et al. | |
| 8,200,638 B1* | 6/2012 | Zheng et al. | 707/679 |
| 8,205,009 B2 | 6/2012 | Heller et al. | |
| 8,271,447 B1 | 9/2012 | Natanzon et al. | |
| 8,332,687 B1 | 12/2012 | Natanzon et al. | |
| 8,335,771 B1 | 12/2012 | Natanzon et al. | |
| 8,543,609 B1* | 9/2013 | Natanzon | 707/791 |
| 8,712,962 B1* | 4/2014 | Natanzon et al. | 707/634 |
| 8,782,003 B1* | 7/2014 | Patterson | 707/624 |
| 2002/0129168 A1 | 9/2002 | Kanai et al. | |
| 2003/0061537 A1 | 3/2003 | Cha et al. | |
| 2003/0110278 A1 | 6/2003 | Anderson | |
| 2003/0196147 A1 | 10/2003 | Hirata et al. | |
| 2004/0205092 A1 | 10/2004 | Longo et al. | |
| 2004/0250032 A1 | 12/2004 | Ji et al. | |
| 2004/0254964 A1 | 12/2004 | Kodama et al. | |
| 2005/0015663 A1 | 1/2005 | Armangau et al. | |
| 2005/0028022 A1 | 2/2005 | Amano | |
| 2005/0049924 A1 | 3/2005 | DeBettencourt et al. | |
| 2005/0172092 A1 | 8/2005 | Lam et al. | |
| 2005/0273655 A1 | 12/2005 | Chow et al. | |
| 2006/0031647 A1 | 2/2006 | Hirakawa et al. | |
| 2006/0047996 A1 | 3/2006 | Anderson et al. | |
| 2006/0064416 A1 | 3/2006 | Sim-Tang | |
| 2006/0107007 A1 | 5/2006 | Hirakawa et al. | |
| 2006/0117211 A1 | 6/2006 | Matsunami et al. | |
| 2006/0161810 A1 | 7/2006 | Bao | |
| 2006/0195670 A1 | 8/2006 | Iwamura et al. | |
| 2006/0212462 A1 | 9/2006 | Heller et al. | |
| 2007/0055833 A1 | 3/2007 | Vu et al. | |
| 2007/0180304 A1 | 8/2007 | Kano | |
| 2007/0198602 A1 | 8/2007 | Ngo et al. | |
| 2007/0198791 A1 | 8/2007 | Iwamura et al. | |
| 2007/0266053 A1 | 11/2007 | Ahal et al. | |
| 2008/0082592 A1 | 4/2008 | Ahal et al. | |
| 2008/0082770 A1* | 4/2008 | Ahal et al. | 711/162 |
| 2010/0122248 A1* | 5/2010 | Robinson et al. | 718/1 |
| 2012/0084523 A1* | 4/2012 | Littlefield et al. | 711/162 |
| 2012/0124307 A1* | 5/2012 | Ashutosh et al. | 711/162 |
| 2013/0179649 A1* | 7/2013 | Green et al. | 711/162 |
| 2014/0325170 A1* | 10/2014 | Aswathanarayana et al. | 711/162 |

OTHER PUBLICATIONS

Soules et al.; "Metadata Efficiency in a Comprehensive Versioning File System", May 2002, CMU-CS-02-145, School of Computer Science, Carnegie Mellon University, Pittsburgh, PA 15213, 33 pages.

Office Action dated Dec. 21, 2011, U.S. Appl. No. 12/045,946, 14 pages.

Office Action dated Jan. 23, 2012 U.S. Appl. No. 12/818,236, 17 Pages.

Soules, Metadata Efficiency in Versioning File Systems, 2003, pp. 1-16.

AIX System Management Concepts: Operating Systems and Devices May 2000, pp. 1-280.

Office Action dated Mar. 31, 2009 for U.S. Appl. No. 11/609,560, 15 pages.

Response to Office Acton filed Jun. 10, 2009 in U.S. Appl. No. 11/609,560, 18 pages.

Office Acton dated Oct. 21, 2009 for U.S. Appl. No. 11/609,560, 34 pages.

Response to Office Action filed on Jan. 14, 2010 in U.S. Appl. No. 11/609,560, 16 pages.

Notice of Allowance dated Sep. 27, 2011 for U.S. Appl. No. 11/609,560, 13 pages.

Office Action dated Aug. 17, 2011 for U.S. Appl. No. 12/057,652, 19 pages.

Response to Office Action filed on Sep. 1, 2011 in U.S. Appl. No. 12/057,652, 9 pages.

Notice of Allowance dated Sep. 27, 2011 for U.S. Appl. No. 12/057,652, 8 pages.

Office Action dated Jun. 11, 2009 for U.S. Appl. No. 11/609,561, 7 pages.

Response to Office Action filed on Sep. 16, 2009 in U.S. Appl. No. 11/609,561, 12 pages.

Office Action dated Jan. 11, 2010 for U.S. Appl. No. 11/609,561, 10 pages.

Pre-Appeal Brief Request for Review filed Mar. 25, 2010 in U.S. Appl. No. 11/609,561, 6 pages.

Notice of Panel Decision from Pre-Appeal Brief Review dated Jul. 16, 2010 in U.S. Appl. No. 11/609,561, 2 pages.

Notice Allowance dated Sep 14, 2010 in U.S. Appl. No. 11/609,561, 7 pages.

Office Action datede Sep. 30, 2008 in U.S. Appl. No. 11/356,920, 34 pages.

Response to Office Action filed Dec. 19, 2008 in U.S. Appl. No. 11/356,920, 23 pages.

Notice of Allowance daed Apr. 20, 2009 in U.S. Appl. No. 11/356,920, 10 pages.

Office Action dated Dec. 12, 2007 in U.S. Appl. No. 10/512,687, 20 pages.

Response to Office Action filed on Jun. 9, 2008 in U.S. Appl. No. 10/512,687, 14 pages.

Office Action dated Sep. 10, 2008 in U.S. Appl. No. 10/512,687, 16 pages.

Response to Office Action filed on Dec. 9, 2008 in U.S. Appl. No. 10/512,687, 13 pages.

Advisory Action dated Jan. 7, 2009 in U.S. Appl. No. 10/512,687, 3 pages.

Response to Office Action filed on Feb. 10, 2009 in U.S. Appl. No. 10/512,687, 23 pages.

(56) References Cited

OTHER PUBLICATIONS

Office Action dated Apr. 3, 2009 in U.S. Appl. No. 10/512,687, 16 pages.
Response to Office Action filed on Jul. 28, 2009 in U.S. Appl. No. 10/512,687, 18 pages.
Office Action dated Nov. 18, 2009 in U.S. Appl. No. 10/512,687, 20 pages.
Response to Office Action filed on Mar. 15, 2010 in U.S. Appl. No. 10/512,687, 19 pages.
Office Action dated Oct. 20, 2011 in U.S. Appl. No. 10/512,687, 28 pages.
Response to Office Action filed on Jan. 10, 2012 in U.S. Appl. No. 10/512,687, 14 pages.
Notice of Allowance dated Apr. 27, 2012 in U.S. Appl. No. 10/512,687, 7 pages.
Office Action dated Sep. 23, 2008 in U.S. Appl. No. 11/536,215, 8 pages.
Response to Office Action filed on Nov. 19, 2008 in U.S. Appl. No. 11/536,215, 10 pages.
Notice of Allowance dated Dec. 10, 2008 in U.S. Appl. No. 11/536,215, 9 pages.
Office Action dated Aug. 19, 2008 in U.S. Appl. No. 11/536,233, 8 pages.
Response to Office Action filed on Sep. 17, 2008 in U.S. Appl. No. 11/536,233, 9 pages.
Office Action dated Oct. 27, 2008 in U.S. Appl. No. 11/536,233, 5 pages.
Response to Office Action filed on Nov. 25, 2008 in U.S. Appl. No. 11/536,233, 11 pages.
Office Action dated Mar. 6, 2009 in U.S. Appl. No. 11/536,233, 29 pages.
Response to Office Action filed on Jun. 3, 2009 in U.S. Appl. No. 11/536,233, 16 pages.
Notice of Allowance dated Sep. 16, 2009 in U.S. Appl. No. 11/536,233, 3 pages.
Office Action dated Apr. 23, 2009 in U.S. Appl. No. 11/536,160, 21 pages.
Response to Office Action filed on Jun. 9, 2009 in U.S. Appl. No. 11/536,160, 12 pages.
Notice of Allowance dated Aug. 31, 2009 in U.S. Appl. No. 11/536,160, 19 pages.
Office Action dated Mar. 25, 2010 in U.S. Appl. No. 11/964,168, 17 pages.
Response to Office Action filed on Apr. 13, 2010 in U.S. Appl. 11/964,168, 10 pages.
Notice of Allowance dated Jul. 8, 2010 in U.S. Appl. No. 11/964,168, 8 pages.

* cited by examiner

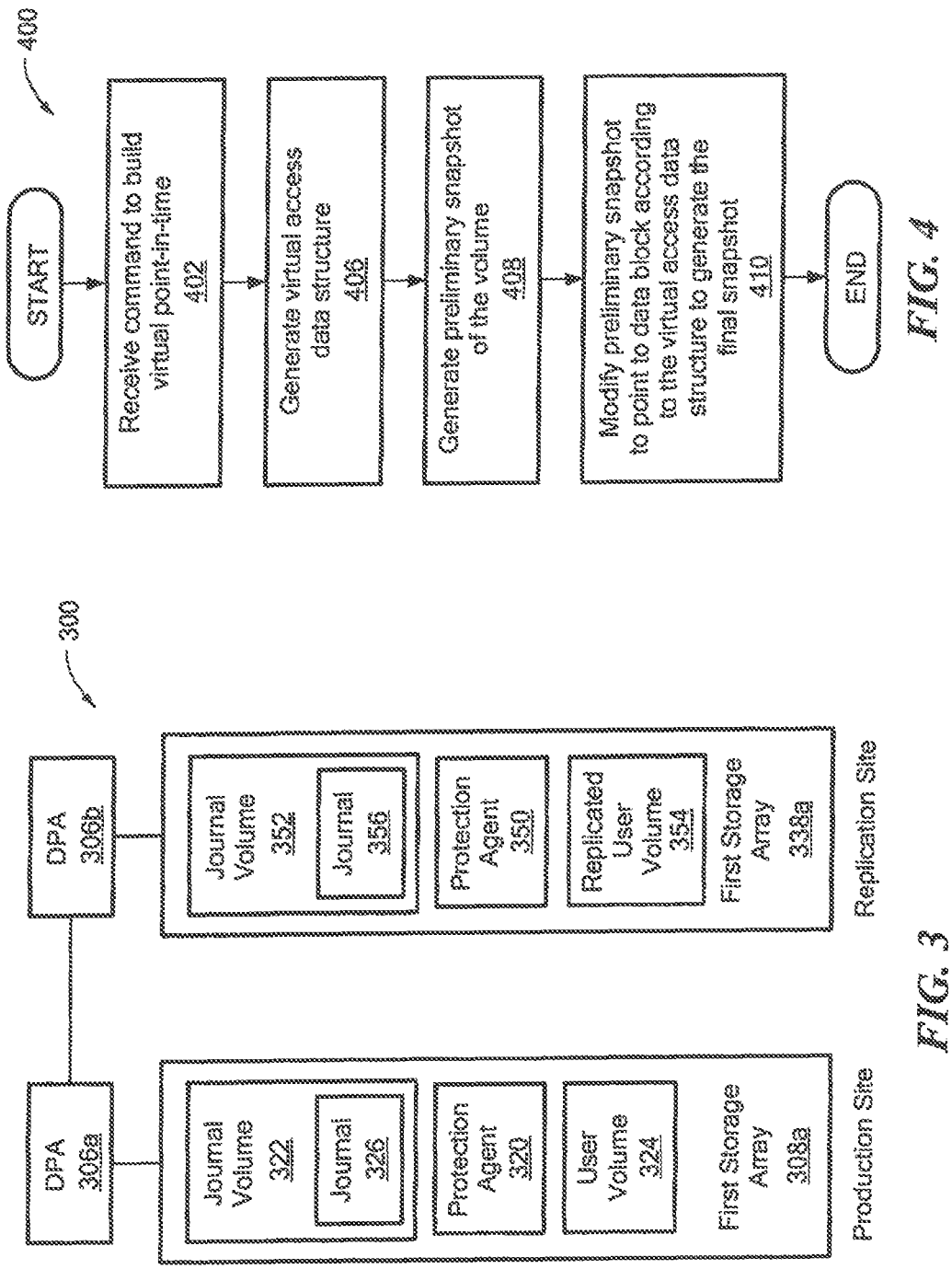

US 8,996,460 B1

ACCESSING AN IMAGE IN A CONTINUOUS DATA PROTECTION USING DEDUPLICATION-BASED STORAGE

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method to generate a point-in-time (PIT) snapshot of deduplication-based volume includes generating a virtual access data structure, generating a preliminary snapshot of the volume and modifying the preliminary snapshot to point to a block according to the virtual access data structure to generate the PIT snapshot of the deduplication-based volume.

In another aspect, an apparatus includes electronic hardware circuitry to generate a point-in-time (PIT) snapshot of deduplication-based volume. The circuitry is configured to generate a virtual access data structure, generate a preliminary snapshot of the volume and modify the preliminary snapshot to point to a block according to the virtual access data structure to generate the PIT snapshot of the deduplication-based volume.

In a further aspect, an article includes a non-transitory computer-readable medium that stores computer-executable instructions to generate a point-in-time (PIT) snapshot of deduplication-based volume. The instructions cause a machine to generate a virtual access data structure, generate a preliminary snapshot of the volume and modify the preliminary snapshot to point to a block according to the virtual access data structure to generate the PIT snapshot of the deduplication-based volume.

BRIEF DESCRIPTION OF THE DRAWINGS

FIG. 3 is a block diagram of another example of a replication system using deduplication-based storage.

FIG. 4 is a flowchart of an example of a process to access an image using the system in FIG. 3.

DETAILED DESCRIPTION

Figure 1:
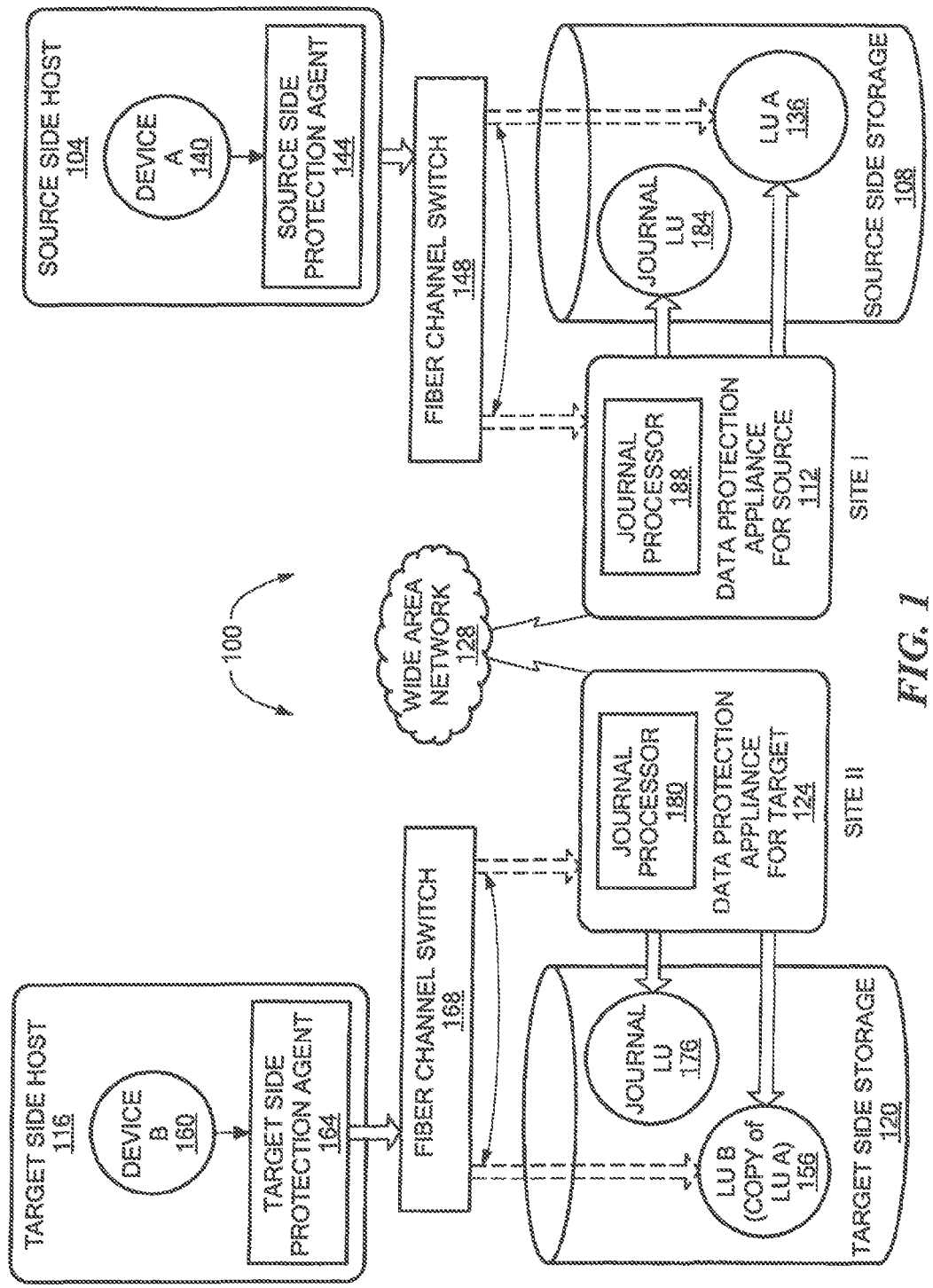
FIG. 1 is a block diagram of an example of a data protection system.

Described herein is an approach to use deduplication-based storage volumes in a replication system to access an image of a volume from some point-in-time (PIT).

The following definitions may be useful in understanding the specification and claims.

BACKUP SITE—a facility where replicated production site data is stored; the backup site may be located in a remote site or at the same location as the production site;

BOOKMARK—a bookmark is metadata information stored in a replication journal which indicates a point in time.

DATA PROTECTION APPLIANCE (DPA)—a computer or a cluster of computers responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

I/O REQUEST—an input/output request (sometimes referred to as an I/O), which may be a read I/O request (sometimes referred to as a read request or a read) or a write I/O request (sometimes referred to as a write request or a write);

JOURNAL—a record of write transactions issued to a storage system; used to maintain a duplicate storage system, and to roll back the duplicate storage system to a previous point in time;

LOGICAL UNIT—a logical entity provided by a storage system for accessing data from the storage system. The logical disk may be a physical logical unit or a virtual logical unit;

LUN—a logical unit number for identifying a logical unit;

PHYSICAL LOGICAL UNIT—a physical entity, such as a disk or an array of disks, for storing data in storage locations that can be accessed by address;

PRODUCTION SITE—a facility where one or more host computers run data processing applications that write data to a storage system and read data from the storage system;

REMOTE ACKNOWLEDGEMENTS—an acknowledgement from remote DPA to the local DPA that data arrived at the remote DPA (either to the appliance or the journal)

SPLITTER ACKNOWLEDGEMENT—an acknowledgement from a DPA to the protection agent (splitter) that data has been received at the DPA; this may be achieved by an SCSI status command.

SAN—a storage area network of nodes that send and receive an I/O and other requests, each node in the network being an initiator or a target, or both an initiator and a target;

SOURCE SIDE—a transmitter of data within a data replication workflow, during normal operation a production site is the source side; and during data recovery a backup site is the source side, sometimes called a primary side;

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side, sometimes called a secondary side;

VIRTUAL LOGICAL UNIT—a virtual storage entity which is treated as a logical unit by virtual machines;

WAN—a wide area network that connects local networks and enables them to communicate with one another, such as the Internet.

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

Figure 2:
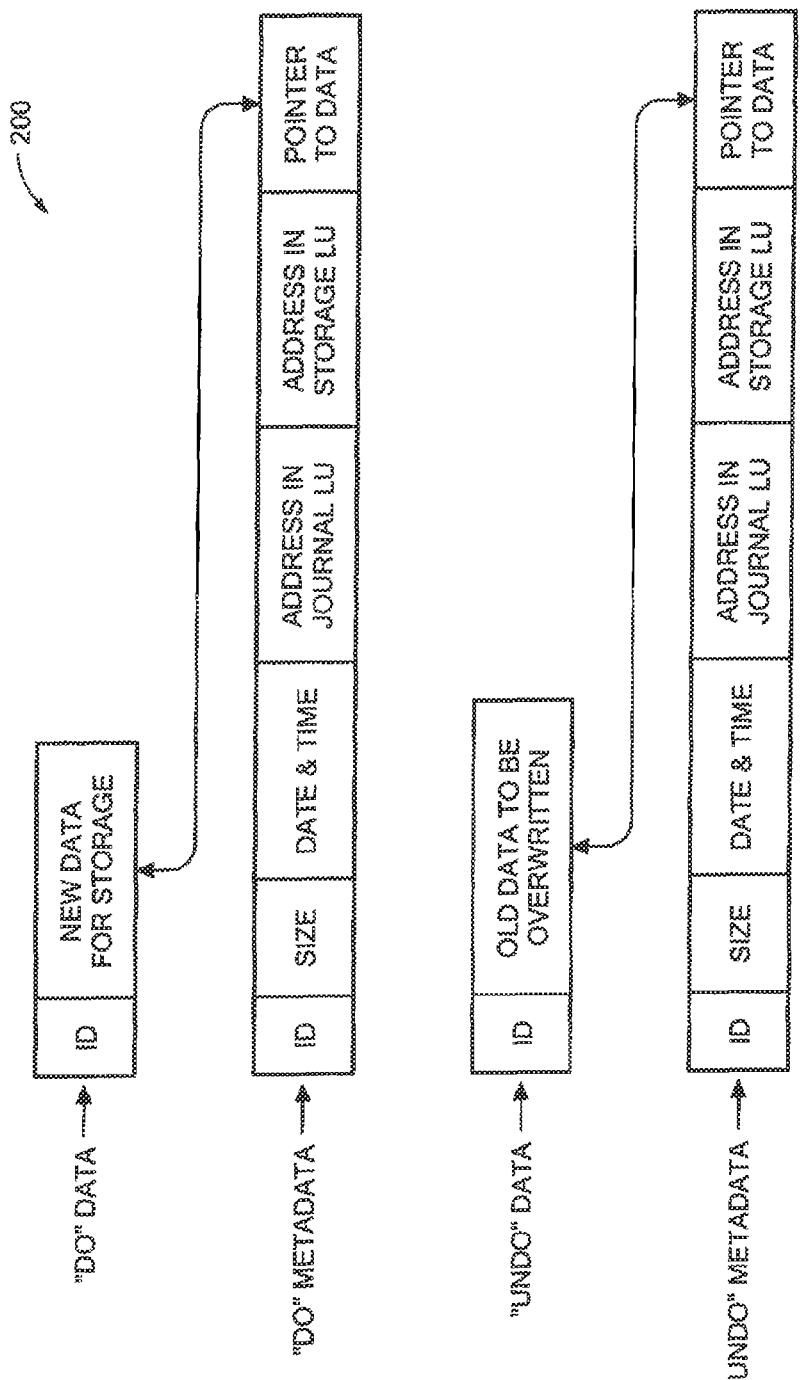
FIG. 2 is an illustration of an example of a journal history of write transactions for a storage system.

Before describing a replication system that includes a deduplication based storage volume, an example replication system is first described in FIGS. 1 and 2.

An Example of a Replication System

Referring to FIG. 1, a data protection system 100 includes two sites; Site I, which is a production site, and Site II, which is a backup site or replica site. Under normal operation the production site is the source side of system 100, and the backup site is the target side of the system. The backup site is responsible for replicating production site data. Additionally, the backup site enables roll back of Site I data to an earlier pointing time, which may be used in the event of data corruption of a disaster, or alternatively in order to view or to access data from an earlier point in time.

FIG. 1 is an overview of a system for data replication of either physical or virtual logical units. Thus, one of ordinary skill in the art would appreciate that in a virtual environment a hypervisor, in one example, would consume logical units and generate a distributed file system on them such as VMFS creates files in the file system and expose the files as logical units to the virtual machines (each VMDK is seen as a SCSI device by virtual hosts). In another example, the hypervisor consumes a network based file system and exposes files in the NFS as SCSI devices to virtual hosts.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks may be used.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (sometimes referred to as a splitter) may run on the host, or on the storage, or in the network or at a hypervisor level, and that DPAs are optional and DPA code may run on the storage array too, or the DPA 124 may run as a virtual machine.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. The logical unit may be a physical logical unit or a virtual logical unit. A logical unit is identified by a unique logical unit number (LUN). Storage system 108 exposes a logical unit 136, designated as LU A, and storage system 120 exposes a logical unit 156, designated as LU B.

LU B is used for replicating LU A. As such, LU B is generated as a copy of LU A. In one embodiment, LU B is configured so that its size is identical to the size of LU A. Thus, for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. Host device 104 identifies LU A and generates a corresponding host device 140, designated as Device A, through which it can access LU A. Similarly, host computer 116 identifies LU B and generates a corresponding device 160, designated as Device B.

In the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein, when acting as a target side DPA, a DPA may also enable roll back of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands or any other protocol.

DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 include protection agents 144 and 164, respectively. Protection agents 144 and 164 intercept SCSI commands issued by their respective host computers, via host devices to logical units that are accessible to the host computers. A data protection agent may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

Protection agents 144 and 164 are drivers located in their respective host computers 104 and 116. Alternatively, a protection agent may also be located in a fiber channel switch, or in any other device situated in a data path between a host computer and a storage system or on the storage system itself. In a virtualized environment, the protection agent may run at the hypervisor layer or in a virtual machine providing a virtualization layer.

What follows is a detailed description of system behavior under normal production mode, and under recovery mode.

In production mode DPA 112 acts as a source site DPA for LU A. Thus, protection agent 144 is configured to act as a source side protection agent; i.e., as a splitter for host device A. Specifically, protection agent 144 replicates SCSI I/O write requests. A replicated SCSI I/O write request is sent to DPA 112. After receiving an acknowledgement from DPA 124, protection agent 144 then sends the SCSI I/O write request to LU A. After receiving a second acknowledgement from storage system 108 host computer 104 acknowledges that an I/O command complete.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

Target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 enters write transactions received by DPA 124 from DPA 112 into the journal, by writing them into the journal LU, reads the undo information for the transaction from LU B. updates the journal entries in the journal LU with undo information, applies the journal transactions to LU B, and removes already-applied transactions from the journal.

Referring to FIG. 2, which is an illustration of a write transaction 200 for a journal. The journal may be used to provide an adaptor for access to storage 120 at the state it was in at any specified point in time. Since the journal contains the "undo" information necessary to roll back storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 is transmitted from source side DPA 112 to target side DPA 124. As shown in FIG. 2, DPA 124 records the write transaction 200 in the journal that includes four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the DO stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the UNDO stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream. In some examples, the metadata stream (e.g., UNDO METADATA stream or the DO METADATA stream) and the data stream (e.g., UNDO stream or DO stream) may be kept in a single stream each (i.e., one UNDO data and UNDO METADATA stream and one DO data and DO METADATA stream) by interleaving the metadata into the data stream.

Referring to FIG. 3, a replication system 300 includes a DPA 306a and a first storage array 308a at the production site and a DPA 306b and a first storage array 338a at the replication site.

The first storage array 308a includes a data protection agent 320, a user volume 324 and a journal volume 322 with a journal 326. The first storage array 338a includes a data protection agent 350, a replicated user volume 354 and a journal volume 352 with a journal 356.

The first storage arrays 308a, 338a include deduplication-based storage volumes. Deduplication-based storage is a storage paradigm that utilizes deduplication technology at the very core of the storage system. For example, I/Os arriving to the deduplication-based storage volume are divided into fixed chunks of data (e.g., 4K). A cryptographically strong signature or fingerprint is calculated for each data chunk. The uniqueness of this signature is the key factor of this kind of storage so that a data chunk is uniquely identified by its data signature. The deduplication-based storage volumes are sequences of the signature data, with the actual data stored separately. Or viewed in another way, the storage data is a big persistent hash table with the signatures used as keys, and the volumes are sequences of those keys.

Thus, actual data may be stored only once in a system while other components in the system references the data by its signature. This reference relates not only to the actual volume storage of the data, but may also relate to memory caches, snapshots, internal copying of data and so forth. The actual data blocks are not copied but rather their signature is. A reference count is kept on each data block, which counts the number of references to that block. When the block is no longer referenced it is removed from the storage.

In one example, the first storage arrays 308a, 338a are flash drives. In order to improve efficiency, the data lookup by signature should be very fast. Since the data lookup is a random access operation by nature it is beneficial that flash technology be used. Deduplication-based storage volumes utilize the high I/O operations per second (IOPS) and random access nature of flash technology. The deduplication complements flash technology limitations by providing a compact representation of the data, and efficiently utilizing the relatively expensive flash capacity. The combination of flash drives and deduplication based storage in the front end forms a very high performance system. In this example entries in the DO stream and UNDO stream of the journal are stored aligned to the block size of the deduplication based storage, i.e. if the de-duplication unit of the storage is 4 KB each journal entry is a multiple of 4 KB and aligned to volume boundaries (i.e. the offset the entry starts at is a multiplication of 4 KB).

Accessing an image at the replication site is generally performed using physical access or virtual access. In physical Access (or logged access), a journal is rolled to the requested point in time by transferring data between the journal and the replica volume. In virtual access, a data structure is generated that designates whether a certain block is in the replicated volume or in the journal (and where in the journal it is). The data structure for a given point in time can be generated relatively quickly, however all data access (reads & writes) need to be routed through the data protection appliance in order to lookup the location in the data structure. This provides fast access to the image but there is slow performance in accessing the actual data.

Using a deduplication-based storage, the same kind of calculations used to build virtual access data structures may be used to generate an actual storage snapshot of the image at the requested point in time. In particular, a snapshot in a deduplication-based storage is a sequence of signatures of data at the moment the snapshot was captured. The snapshot is typically stored in a very efficient way, so that pointers are not needed to be kept for every signature; but rather, only pointers that are different between the snapshot and the original volume need to be stored. When data changes on the primary storage volume the pointer at the snapshot continues to point the old data signature. Using the signatures of the data stored in the journal, and the signatures of the current volume, a complete snapshot at a PIT can be artificially reconstructed. If the data of an area at the PIT resides on the replication storage volume, the signature sequences of the replication storage volume is used. If the data at the PIT is in the journal, the signature from the journal is used. The resulting structure is a snapshot that is generated quickly but with regular volume performance, I/Os.

The I/Os in such an implementation do not need to be re-directed to the replication data protection appliance (e.g., DPA 306b), but served directly from the replication storage array (e.g., first storage array 338a).

Once the snapshot is generated the data structure generated by the data protection appliance may be erased. As for the storage system the generated snapshot is a regular snapshot.

In other embodiments the replication may be from the first storage array to itself, providing local copies to any point in time. The data protection appliance may also be a set of processes running in the storage array.

Referring to FIG. 4, an example of a process to access a point-in-time (PIT) image of a volume in a continuous data protection system using deduplication-based storage is a process 400.

Process 400 receives a command to build a virtual PIT image (402). For example, a user generates a command to the replication system 300 to build a virtual PIT image.

Process 400 generates a virtual access data structure (406). A virtual access data structure, for a given offset (i.e., location in the volume) and a length (size of the data), determines where the relevant blocks of data are located. If the location was referenced in an undo area of the journal (e.g., an UNDO METADATA stream), the data structure points to the earliest location in the undo journal (e.g., an UNDO stream and UNDO METADATA stream) where the region has changed. If the region has not changed, the data in the replica volume is valid. It is important to note that the undo data is stored in the UNDO stream in an aligned format, so that pointers of the snapshot can be changed to point to the same data as the in the undo journal.

To generate the data structure the relevant areas of the journal's undo log are sorted according to offset. The relevant entries in the undo log are all entries which are newer than the point in time the user requested. A filter is applied and only the oldest version for each offset is kept. The sorted entries of the image are written to a special log device metadata log device. The metadata log device is a list of sorted entries and each entry includes:

1. The start offset in the volume which the entry describes (e.g., 8 bytes)
2. The number of blocks the entry describes (e.g., 4 bytes)
3. The offset in the undo journal which the entry describes. (e.g., 8 bytes)
4. In some cases the metadata log may include the signature for each 4 KB of data, for example (i.e., 32 bytes per 4 KB).

The entries are sorted according to their offset in the volume.

A virtual access table is generated which includes for each changed location, either the signature of the data in the journal, or a pointer to the journal volume where the data is stored. In one example, the virtual access table is stored in the first storage array 338a.

An example of virtual access data structure and some techniques associated with generating a virtual access data structure is described in the patent titled "METHODS AND APPARATUS FOR MULTIPLE POINT IN TIME DATA ACCESS" and with U.S. Pat. No. 7,849,361, which is hereby incorporated by reference.

Process 400 generates a preliminary snapshot of the volume (408) by, for example, calling an application program interface (API) of the de-duplication storage to generate a snapshot.

Process 400 modifies the snapshot to point to a data block according to the virtual access data structure to generate the final snapshot (410). For example, through an API, for each location pointing to the journal, the snapshot is modified to point to the block according to the virtual access data structure. The modifying may be done with an xcopy SCSI command from the journal to the volume. In other examples, the changing of the snapshot to point to the signatures of the data which is stored on the journal is done by a vendor specific write signature API which obtains a signature and an offset and writes the data matching the signature to the offset if the signature exists or an NOT_EXIST error is returned otherwise.

In further examples, a multi write signature vendor specific API may be used which obtains a list of offsets in the snapshot and the new signatures of the offset. The new signatures are guaranteed to be stored in the replica storage since the data matching the signatures is stored in the undo journal.

Figure 5:
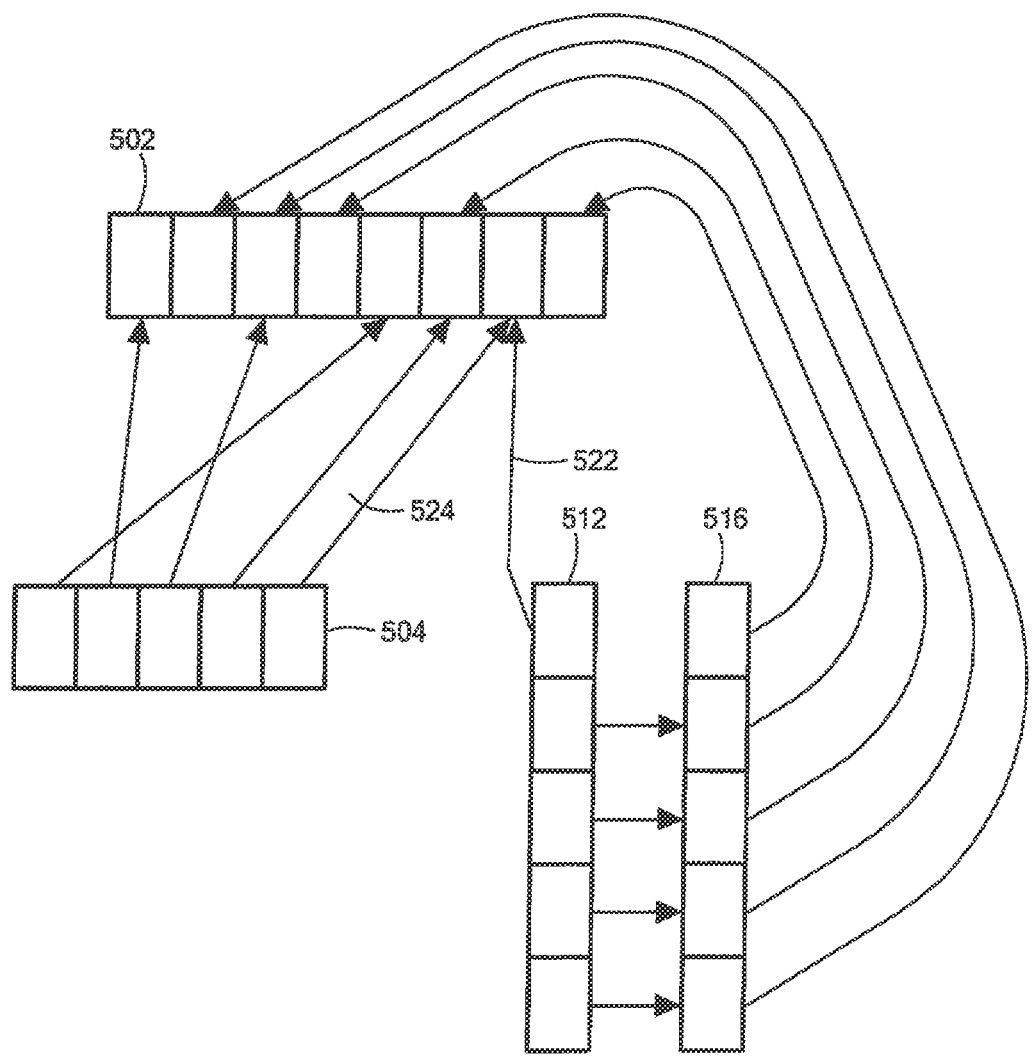
FIG. 5 is a diagram of an example of pointers used with a snapshot, a volume, s deduplication storage signature table, an UNDO steam and an UNDO METADATA stream.

FIG. 5 depicts a deduplication storage signature table 502, an UNDO stream 504, a point-in-time (PIT) snapshot 512 of a deduplication-based volume 51, the volume 516 and a pointer scheme between them. For example, all the pointers from the snapshot 512 point to the volume 516 but a pointer 522. Each of the pointers from the volume 502 points to a signature in the deduplication storage signature table 502. The pointer 522 and a pointer 524 from the UNDO stream 504 both point to the same signature in the deduplication storage signature table 502.

Figure 6:
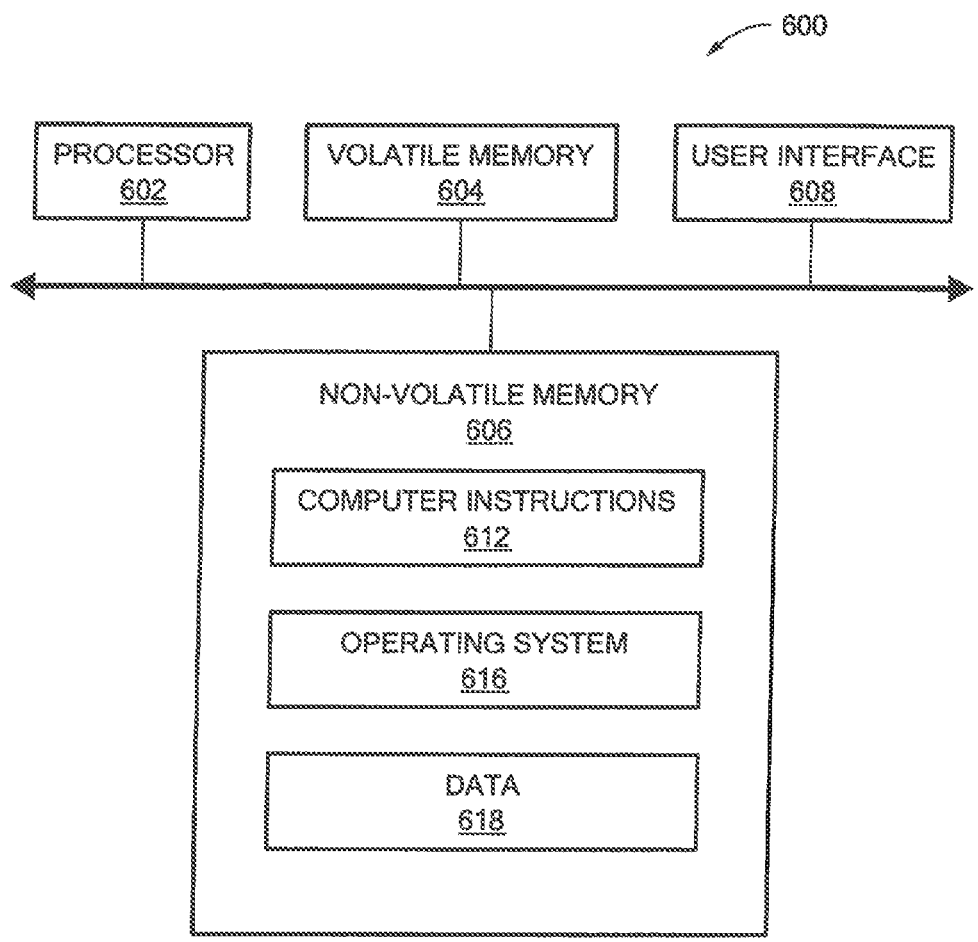
FIG. 6 is a computer on which the process of FIG. 4 may be implemented.

Referring to FIG. 6, in one example, a computer 600 includes a processor 602, a volatile memory 604, a non-volatile memory 606 (e.g., hard disk) and the user interface (UI) 608 (e.g., a graphical user interface, a mouse, a keyboard, a display, touch screen and so forth). The non-volatile memory 606 stores computer instructions 612, an operating system 616 and data 618. In one example, the computer instructions 612 are executed by the processor 602 out of volatile memory 604 to perform all or part of the processes described herein (e.g., process 400).

The processes described herein (e.g., process 400) are not limited to use with the hardware and software of FIG. 6; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 400 is not limited to the specific processing order of FIG. 4. Rather, any of the processing blocks of FIG. 4 may be re-ordered, combined or removed, performed in parallel or in serial, as necessary, to achieve the results set forth above.

The processing blocks (for example, in the process 400) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method to generate a point-in-time (PIT) snapshot of deduplication-based volume comprising:
    generating a virtual access data structure;
    generating a preliminary snapshot of the volume;
    modifying the preliminary snapshot to point to a block according to the virtual access data structure to generate the PIT snapshot of the deduplication-based volume; and
    storing undo data in an undo stream in an aligned format to enable pointers of the PIT snapshot to be changed to point to the undo data in the undo stream.

2. The method of claim 1 wherein modifying the preliminary snapshot to point to a block according to the virtual access data structure to generate the PIT snapshot of the deduplication-based volume comprises modifying the snapshot using an xcopy command.

3. The method of claim 1 wherein modifying the preliminary snapshot to point to a block according to the virtual access data structure to generate the PIT snapshot of the deduplication-based volume comprises modifying the snapshot using a special application program interface (API) to write offsets and signatures.

4. The method of claim 3 wherein modifying the snapshot using a special application program interface (API) to write the offsets and the signatures comprises using a vendor specific write signature API which obtains a signature and an offset and writes the data matching the signature to the offset if the signature exists.

5. The method of claim 3 wherein modifying the snapshot using a special application program interface (API) to write the offsets and the signatures comprises using a multi write signature vendor specific API to obtain a list of offsets in the snapshot and the new signatures of the offset.

6. An apparatus, comprising:
    electronic hardware circuitry to generate a point-in-time (PIT) snapshot of deduplication-based volume, the circuitry configured to:
        generate a virtual access data structure;
        generate a preliminary snapshot of the volume; and
        modify the preliminary snapshot to point to a block according to the virtual access data structure to generate the PIT snapshot of the deduplication-based volume; and
        store undo data in an undo stream in an aligned format to enable pointers of the PIT snapshot to be changed to point to the undo data in the undo stream.

7. The apparatus of claim 6 wherein the circuitry comprises at least one of a processor, a memory, a programmable logic device or a logic gate.

8. The apparatus of claim 6 wherein the circuitry configured to modify the preliminary snapshot to point to a block according to the virtual access data structure to generate the PIT snapshot of the deduplication-based volume comprises circuitry configured to modify the snapshot using an xcopy command.

9. The apparatus of claim 6 wherein the circuitry configured to modify the preliminary snapshot to point to a block according to the virtual access data structure to generate the PIT snapshot of the deduplication-based volume comprises circuitry configured to modify the snapshot using a special application program interface (API) to write offsets and signatures.

10. The apparatus of claim 9 wherein the circuitry configured to modify the snapshot using a special application program interface (API) to write the offsets and the signatures comprises circuitry configured to use a vendor specific write signature API which obtains a signature and an offset and writes the data matching the signature to the offset if the signature exists.

11. The apparatus of claim 9 wherein the circuitry configured to modify the snapshot using a special application program interface (API) to write the offsets and the signatures comprises circuitry configured to use a multi write signature vendor specific API to obtain a list of offsets in the snapshot and the new signatures of the offset.

12. An article comprising:
a non-transitory computer-readable medium that stores computer-executable instructions to generate a point-in-time (PIT) snapshot of deduplication-based volume, the instructions causing a machine to:
generate a virtual access data structure;
generate a preliminary snapshot of the volume;
modify the preliminary snapshot to point to a block according to the virtual access data structure to generate the PIT snapshot of the deduplication-based volume; and
store undo data in an undo stream in an aligned format to enable pointers of the PIT snapshot to be changed to point to the undo data in the undo stream.

13. The article of claim 12 wherein the instructions causing the machine to modify the preliminary snapshot to point to a block according to the virtual access data structure to generate the PIT snapshot of the deduplication-based volume comprises instructions causing the machine to modify the snapshot using an xcopy command.

14. The article of claim 12 wherein the instructions causing the machine to modify the preliminary snapshot to point to a block according to the virtual access data structure to generate the PIT snapshot of the deduplication-based volume comprises instructions causing the machine to modify the snapshot using a special application program interface (API) to write offsets and signatures.

15. The article of claim 14 wherein the instructions causing the machine to modify the snapshot using a special application program interface (API) to write the offsets and the signatures comprises instructions causing the machine to use a vendor specific write signature API which obtains a signature and an offset and writes the data matching the signature to the offset if the signature exists.

16. The article of claim 14 wherein the instructions causing the machine to modify the snapshot using a special application program interface (API) to write the offsets and the signatures comprises instructions causing the machine to use a multi write signature vendor specific API to obtain a list of offsets in the snapshot and the new signatures of the offset.

17. The method of claim 1 wherein generating the virtual access data structure comprises:
sorting entries in the undo stream by offset; and
filtering out all the sorted entries but the oldest version for each offset.

18. The method of claim 17 wherein sorting the entries in the undo stream by offset comprises sorting relevant entries in the undo stream which are newer than the PIT.

19. The apparatus of claim 6 wherein the circuitry configured to generate the virtual access data structure comprises circuitry configured to:
sort entries in the undo stream by offset; and
filter out all the sorted entries but the oldest version for each offset.

20. The article of claim 14 wherein the instructions causing the machine to generate a virtual access data structure comprises instructions causing the machine to:
sort entries in an undo stream by offset; and
filter out all the sorted entries but the oldest version for each offset.

* * * * *